United States Patent [19]
Marten et al.

[11] Patent Number: 4,481,349
[45] Date of Patent: Nov. 6, 1984

[54] HARDENER FOR EPOXY RESINS AND PROCESS FOR HARDENING EPOXY RESINS

[75] Inventors: Manfred Marten; Wilhelm Becker, both of Hamburg, Fed. Rep. of Germany

[73] Assignee: Hoechst Aktiengesellschaft, Fed. Rep. of Germany

[21] Appl. No.: 530,220

[22] Filed: Sep. 8, 1983

[30] Foreign Application Priority Data

Sep. 10, 1982 [DE] Fed. Rep. of Germany ....... 3233565

[51] Int. Cl.³ ............................................. C08G 59/50
[52] U.S. Cl. .................................... 528/120; 528/103; 528/407; 252/182
[58] Field of Search ...................... 528/120, 103, 407; 252/182

[56] References Cited

U.S. PATENT DOCUMENTS 3,704,229 11/1972 Tashiro et al. ................... 528/120 X
3,853,812 12/1974 Helm ................................... 528/120
4,316,003 2/1982 Dante et al. ..................... 528/120 X Primary Examiner—Earl A. Nielsen
Attorney, Agent, or Firm—Charles A. Muserlian

[57] ABSTRACT

Hardener for epoxy resins based on
(a) araliphatic or cycloaliphatic diamines with 4 amino hydrogen atoms, which are liquid at ambient temperature, or derivatives thereof with at least 3 amino hydrogen atoms,
(b) optionally conventional modifiers for the polyamines according to (a) and
(c) optionally conventional additives, containing
(d) 0.1 to 10% by weight of primary aliphatic monoamines the alkyl groups of which contain 5 to 18 carbon atoms, and a process for hardening epoxy resins with hardeners of this kind.

13 Claims, No Drawings

HARDENER FOR EPOXY RESINS AND PROCESS FOR HARDENING EPOXY RESINS

The invention relates to hardeners for epoxy resins and a process for hardening epoxy resins with these hardeners.

It is known to react epoxy resins with polyamines in order to produce molded articles and coatings which are insoluble and infusible; however, it has hitherto not been possible to obtain clear, waterproof, elastic hardened products which are resistant to chemicals by reacting low-molecular pourable polyepoxide compounds with equivalent quantities of araliphatic or cycloaliphatic polyamines or the modification products thereof at ambient temperature.

Araliphatic or cycloaliphatic polyamines or the modification products thereof, when combined with low-molecular liquid polyepoxides, yield reaction mixtures with a short period of use or pot life, but which harden extremely slowly when the mixture is applied in a thin layer. Admittedly, the resulting coatings have good resistance to chemicals but they are cloudy, have poor flow properties and only limited waterproof qualities. The reason for this phenomenon is the absorption of $CO_2$ and water from the air, causing some of the amino groups to be converted into carbaminates or carbonates and thus making them unavailable for reaction with epoxy groups.

To overcome these disadvantages, it was proposed in DE-OS No. 17 70 832 that molded articles and coatings be produced by reacting polyepoxide compounds with, for example, cycloaliphatic polyamino compounds having at least two primary and/or secondary amino groups, in the presence of alkylphenols, optionally in the presence of conventional additives, even without any solvents present and at temperatures of below 20° C., the polyepoxide compounds which are liquid at the processing temperature being reacted with a liquid mixture of polyamino compounds and liquid alkylphenols in which the molar ratio of the sum of primary and/or secondary amino groups to the hydroxy groups in the alkylphenol is from 0.9 to 1.1:1. However, this addition of free alkylphenols leads to a deterioration in the resistance to chemicals of the molded articles and coatings produced from the araliphatic or cycloaliphatic polyamines and epoxy resins.

To overcome these disadvantages, DE-OS No. 21 64 099 proposes a process for preparing polyadducts based on 1,2-epoxy compounds with more than one epoxy group in the molecule and amines using known methods, wherein the amines used are products obtained by the cyanoalkylation of amines of general formula $H(NH-R-)_mNH-R'-NH_2$, wherein m is 0 to 10 and R and R' represent identical or different, branched or non-branched alkylene groups with 2 to 40, preferably 2 to 20 carbon atoms which may optionally contain one or more carboxylic amine groupings in the alkylene chain, whilst the cyanoalkylated amines contain at least two H atoms bonded to basic nitrogen atoms.

Moreover, according to DE-OS No. 24 60 305, aralkylaminoacrylonitrile adducts such as cyanoethylated m- or p-xylylenediamine may be used with liquid epoxy resins to produce transparent mouldings with a glossy surface. U.S. Pat. No. 3,478,081 mentions cyanoethylated bis-(aminoalkyl)-cyclohexanes as hardeners for epoxy resins which should yield moldings with good flexibility and high heat resistance.

The use of cyanoalkylation products of araliphatic or cycloaliphatic polyamines also results in a deterioration of the resistance to chemicals of the moldings and coatings. A further disadvantage of these cyanoalkylation products is the often undesirably long processing time (pot life).

Finally, it has already been proposed that epoxy molding or coating compositions be prepared using monoamines of the kind which contain an amino group bonded to a cycloaliphatic group, wherein the cycloaliphatic group is bonded to another cycloaliphatic group either directly or via bridging atoms, optionally in admixture with polyvalent aliphatic or cycloaliphatic amines such as 4,4'-diaminodicyclohexyl, 4,4'-diaminodicyclohexylmethane and 1,2- or 1,4-diaminocyclohexane. The minimum quantity of monoamines is 40%.

It has now been found that it is possible to avoid these disadvantages and still obtain molded articles (including flat articles such as coatings) which are resistant to chemicals, by using hardeners consisting of (a) araliphatic or cycloaliphatic diamines with 4 amino hydrogen atoms, which are liquid at ambient temperature, or derivatives thereof with at least 3 and preferably at most 5 amino hydrogen atoms, (b) optionally conventional modifiers therefor and (c) optionally conventional additives, if (d) 0.1 to 10% by weight, preferably 0.5 to 5% by weight, based on the sum of components (a) and (d), of primary aliphatic monoamines are also used, the alkyl groups of which contain from 5 to 18, preferably 6 to 10 carbon atoms. An essential feature of the invention is that components (a), (b) and (d) should be compatible with one another.

The diamines according to (a) are preferably m-xylylenediamine or the liquid mixtures thereof with p-xylylenediamine, and also, for example, 1,3- or 1,4-bis-(aminomethyl)-cyclohexane or mixtures of these diamines. Suitable derivatives include, for example, Mannich bases, which are preferred and which are prepared by condensing the amines with aldehydes such as formaldehyde or acetaldehyde and phenols such as phenol, the cresols or p-tert.butylphenol. However, they may also have been reacted partially with the above mentioned liquid epoxy resins to form amine adducts which are still liquid and therefore workable.

Examples of suitable monoamines (d), which are generally liquid, include the straight-chained or branched hexyl-, heptyl-, octyl-, nonyl-, decyl- or dodecylamines, preferably n-octylamine or isononylamine, all either individually or in admixture.

With the process according to the invention, completely clear casting compositions and mouldings (including coatings) are obtained which have good resistance to chemicals, particularly to salts, acids and alkalis, and good resistance to ageing, highly waterproof properties and a smooth surface free from craters. It is also possible to include solvents, diluents and/or plasticisers in amounts of less than 30% by weight in all. It is also possible to process the compositions with suitable two-component spray guns, and this has the advantage that the limited period of use of the reaction mixtures can be extended. Since the reaction of the hardeners according to the invention with the epoxy resins occurs rapidly even at temperatures of from 0° to 20° C., there is no need to heat the reaction mixture.

Suitable epoxy resins include all products which are liquid at ambient temperature and contain more than one epoxy group in the molecule, or solutions of solid epoxy resins. These are, in particular, low-molecular liquid polyglycidyl ethers which can be obtained in conventional manner by reacting polyhydric phenols, particularly bisphenols, or polyhydric alcohols such as glycerol, pentaerythritol or butanediol-1,4 with epihalohydrin such as epibromohydrin, but preferably epichlorohydrin. Polyglycidyl esters and liquid polyepoxides which can be obtained from low-molecular unsaturated hydrocarbons and hydroperoxides are also suitable. Examples of suitable polyepoxide compounds, which preferably have a molecular weight of less than 600, include the diglycidyl ethers of 2,2-bis(p-hydroxyphenyl)-propane and the polyglycidyl ethers of pentaerythritol, glycerol, propyleneglycol-1,2 or butanediol-1,4. However, it is also possible to use solid epoxy resins if they are brought into liquid form by the use of solvents. The polyepoxides may be used alone or in admixture with one another or together with minor added amounts of monoepoxide compounds amounting to, for example, up to 5% by weight. Examples of suitable monoepoxide compounds of this kind include epoxidised monounsaturated hydrocarbons with at least 4 carbon atoms such as butylene, cyclohexene and styrene oxide, halogen-containing epoxides such as epichlorohydrin, glycidyl ethers of monohydric alcohols, e.g. of methyl, ethyl, butyl, 2-ethylhexyl or dodecyl alcohol, glycidyl ethers of monohydric phenols, e.g. of phenol, cresol and other phenols substituted in the o- or p-position, glycidyl esters of unsaturated carboxylic acids, epoxidised esters of olefinically unsaturated alcohols or of olefinically unsaturated carboxylic acids and the acetals of glycidaldehyde.

The conventional modifiers (b) used may be, for example, flexibilising agents and particularly solvents in which both the amines (a) and (d) and also the epoxy resins are soluble. Suitable solvents include, for example, aromatic hydrocarbons such as toluene and the xylenes, either alone or in admixture with alcohols such as n- and i-butanol and the amyl alcohols, and also ketones such as methylethyl ketone and methylisobutyl ketone, also benzyl alcohol, the mono- or diethers of ethylene glycol or 1,2-propylene glycol with methanol, ethanol, propanol or the various butanols, either individually or in admixture. Examples of flexibilising agents include phthalic acid esters of monohydric alcohols, e.g. n-butanol, amyl alcohol, 2-ethylhexanol, nonanol and benzyl alcohol either individually or in admixture, γ-butyrolactone, δ-valerolactone, ε-caprolactone, furfuryl alcohol, low- and higher-molecular polyhydric alcohols such as glycerol, trimethylolethane or trimethylolpropane, ethyleneglycol and ethoxylated or propoxylated polyhydric alcohols.

The hardeners may additionally contain further conventional additives such as inert fillers, pigments, dyes, soluble dyes and the like. Suitable fillers are, for example, silicon oxide, hydrated aluminum oxide, titanium dioxide, glass fibres, sawdust, mica, graphite, calcium silicate and/or sand and the conventional pigments, for example with particle sizes of from 5 to 500 μm.

Finally, other conventional hardeners for the reaction with the polyepoxide compounds may be added to the hardener mixtures in amounts of up to 10% by weight based on the total quantity of hardeners.

In the following Examples and in the Table, HAV indicates hydrogen equivalent weights, TZ indicates pot life and RT indicates ambient temperature.

PRELIMINARY PRODUCTS FOR THE EXAMPLES

The following condensates were prepared:

(A) 136 g of m-xylylenediamine (1 mol) was mixed with 94 g of phenol (1 mol) in a three-necked flask fitted with a stirrer, thermometer and separator, with stirring, and then heated to 70° C. Then 58 g of 36.5% formaldehyde (0.7 mol) were introduced within about 4 hours at 70° C., the water was distilled off under reduced pressure at a maximum temperature of 70° C. and the mixture was heated to 90° C. within 1 hour at 40 to 60 mbar. The reaction product was kept under these conditions for a further hour, then cooled and ventilated. The Mannich base condensate obtained had a viscosity of 2500 mPa.s (25° C.) (HAV 70).

(B) 150 g of m-xylylenediamine (1.3 mol) were mixed with 94 g of phenol (1 mol), with stirring, in the apparatus described in (A) and then heated to 70° C. Then 107 g of 36.5% formaldehyde (1.3 mol) were introduced within 3 hours at 70° C. After a period of 30 minutes at 70° C., reduced pressure was applied and the water was distilled off, the reaction product was kept at 105° C. under a pressure of 40 to 60 mbar for 30 minutes, then cooled and ventilated. In a 90% ethanol solution, the Mannich base condensate obtained had a viscosity of 9900 mPa.s (25° C.); (HAV 83.7).

I: EXAMPLES 1 TO 5 (HARDENERS)

The quantities of polyamines and monoamines given below were stirred together at 30° C. under nitrogen until fully mixed:

1. 97 g of m-xylylenediamine and 3 g of octylamine; HAV of the mixture: 34.5.
2. 97 g of m-xylylenediamine and 3 g of isononylamine (mixture of isomeric nonylamines with about 90% of 3,5,5-trimethylhexylamine); HAV of the mixture: 34.5.
3(a) 97.5 g of the Mannich base condensate (A) and 2.5 g of octylamine; HAV of the mixture: 69.8.
3(b) 97.5 g of the Mannich base condensate (A) and 2.5 g of isononylamine; HAV of the mixture: 70.
3(c) 97.5 g of the Mannich base condensate A and 2.5 g of decylamine; HAV of the mixture: 70.2.
4(a) 75 g of the Mannich base condensate B, 22.5 g of benzyl alcohol and 2.5 g of octylamine; HAV of the mixture: 107.
4(b) 75 g of the Mannich base condensate B, 22.5 g of benzyl alcohol and 2.5 g of isononylamine; HAV of the mixture: 107.4.
5. 97 g of cyclohexane-1,4-bismethylamine and 3 g of octylamine; HAV of the mixture: 36.

COMPARISON HARDENERS

V 1: m-xylylenediamine (hydrogen equivalent 34)
V 2: Mannich base condensate A
V 3: 75 g of the Mannich base condensate B and 25 g of benzyl alcohol were stirred at 30° C., under nitrogen, until fully mixed; (HAV of the mixture: 111).
V 4: cyclohexane-1,4-bismethylamine (HAV 35.5).

II: EXAMPLES 6 TO 10 (COATINGS)

Coatings were prepared in the manner described hereinafter using the products and comparison products listed under I and an epoxy resin and these coatings were assessed by testing.

100 g of a low-molecular diphenylolpropane diglycidyl ether with a viscosity of about 10,000 mPa.s and an epoxy equivalent weight of 183 were mixed with a quantity of the relevant hardener corresponding to the hydrogen equivalent and a film 200 μm thick was applied to two glass sheets. One sheet was stored for 24 hours at 23° C. at a relative humidity of 40 to 50%, while the other sheet was stored at 5° C. for 24 hours. The films were tested for their tackiness, cloudiness and hardness. Then the coated sheets were placed in a water bath for 30 minutes and, after drying, the alteration (cloudiness) of the film was assessed.

As can be seen from the Table, the coatings prepared with the hardeners according to the invention have a satisfactory surface quality whereas a greater or lesser degree of cloudiness is observed in the comparison Examples. This cloudiness results in other disadvantages which are overcome by the hardeners according to the invention and thus prove their technical progress. On the one hand, the formation of carbonates or carbaminates which causes the cloudiness substantially impairs the interfacial adhesion of another layer applied thereto. Secondly, the formation of carbonates or carbaminates reduces the density of cross linking in the hardened film. Points of attack for chemicals such as dilute organic acids are formed; the resistance to chemicals is thus reduced.

TABLE

Testing of the coatings

| Example | V6 | 6 | 7 | V7 | 8a | 8b | 8c |
|---|---|---|---|---|---|---|---|
| Hardener according to | Example V1 | Example 1 | Example 2 | Example V2 | Example 3a | Example 3b | Example 3c |
| HAV value | 34 | 34.5 | 34.5 | 70 | 69.8 | 70 | 70.2 |
| TZ in min. | 116 | 116 | 111 | 16 | 16 | 16 | 16 |
| Surface 24 h RT | touch-dry, cloudy | touch-dry | touch-dry | slightly tacky | touch-dry | touch-dry | touch-dry |
| Surface 24 h 5° C. | touch-dry, cloudy | touch-dry (very slightly cloudy, can be wiped clear) | touch-dry (very slightly cloudy, can be wiped clear) | tacky | touch-dry | touch-dry | touch-dry |
| Film a. 24 h at RT | hard, brittle | hard, brittle | hard, brittle | hard, elastic | hard, elastic | hard, elastic | hard, elastic |
| Film a. 24 h at 5° C. | soft, brittle | soft, brittle | soft, brittle | soft, brittle | soft, brittle | soft, brittle | soft, brittle |
| Film a. 24 h at RT in a water bath | very cloudy | unchanged | unchanged | cloudy | unchanged | unchanged | unchanged |
| Film a. 24 h at 5° C. in a water bath | very cloudy | unchanged (i.e. no additional cloudiness) | unchanged (i.e. no additional cloudiness) | cloudy | unchanged | unchanged | unchanged |

| Example | V8 | 9a | 9b | V9 | 10 |
|---|---|---|---|---|---|
| Hardener according to | Example V3 | Example 4a | Example 4b | Example V4 | Example 5 |
| HAV value | 111 | 107 | 107.4 | 34.5 | 36 |
| TZ in min. | 25 | 25 | 25 | 60 | 60 |
| Surface 24 h RT | slightly tacky | touch-dry | touch-dry | touch-dry, cloudy | touch-dry |
| Surface 24 h 5° C. | tacky | touch-dry | touch-dry | touch-dry, cloudy | touch-dry (very slightly cloudy) |
| Film after 24 h at RT | hard, elastic | hard, elastic | hard, elastic | hard, brittle | hard, brittle |
| Film after 24 h at 5° C. | soft, slightly brittle | soft, slightly brittle | soft, slightly brittle | soft, brittle | soft, brittle |
| Film after 24 h at RT in the water bath | slightly cloudy | unchanged | unchanged | very cloudy | unchanged |
| Film after 24 h at 5° C. in the water bath | cloudy | unchanged | unchanged | very cloudy | unchanged (i.e. no additional cloudiness) |

We claim:

1. A hardener composition for epoxy resins comprising
    (a) an araliphatic or cycloaliphatic diamine having 4 amino hydrogen atoms or a derivative thereof having at least 3 amino hydrogen atoms, said diamine or derivative thereof being liquid at room temperature, together with
    (b) 0.1 to 10 percent by weight of a primary aliphatic monoamine having 5 to 18 carbon atoms, the percentage being referred to the total amount of diamine, its derivative and monoamine.

2. A hardener composition as claimed in claim 1, wherein the amount of aliphatic monoamine is in the range from 0.5 to 5 percent by weight.

3. A hardener composition as claimed in claim 1, wherein the primary aliphatic monoamine has from 6 to 10 carbon atoms.

4. A hardener composition as claimed in claim 1, wherein component (a) contains m-xylylene diamine or a derivative thereof.

5. A hardener composition as claimed in claim 1, wherein the derivative of the diamine is a Mannich-base.

6. A hardener composition as claimed in claim 1 which also contains a modifying agent.

7. A hardener composition as claimed in claim 6, wherein the modifying agent is a solvent which is capable of dissolving as well components (a) and (b) as epoxy resins.

8. A hardener composition as claimed in claim 1 which also contains a further additive selected from the group consisting of fillers and auxiliary agents.

9. A process for hardening an epoxy resin which is liquid by itself or dissolved in a solvent, with a hardener composition for epoxy resins comprising (a) an araliphatic or cycloaliphatic diamine having 4 amino hydrogen atoms or a derivative thereof having at least 3 amino hydrogen atoms, said diamine or derivative thereof being liquid at room temperature, together with (b) 0.1 to 10 percent by weight of a primary aliphatic monoamine having 5 to 18 carbon atoms, the percentage being referred to the total amount of diamine, its derivative and monoamine.

10. A process as claimed in claim 9, wherein the epoxy resin is liquid at room temperature.

11. A process as claimed in claim 9, wherein the molecular weight of the epoxy resin is below 600.

12. A process as claimed in claim 9, wherein component (a) of the hardener composition is m-xylylene diamine or its Mannich-base.

13. A hardened article comprising an epoxide hardened by a hardener composition as claimed in claim 1.

* * * * *